United States Patent [19]

McKinley

[11] Patent Number: 4,569,768

[45] Date of Patent: Feb. 11, 1986

[54] FLOCCULATION OF SUSPENDED SOLIDS FROM AQUEOUS MEDIA

[75] Inventor: Mark J. McKinley, Linwood, Mich.

[73] Assignee: The Dow Chemical Company, Midland, Mich.

[21] Appl. No.: 700,790

[22] Filed: Feb. 11, 1985

Related U.S. Application Data

[63] Continuation-in-part of Ser. No. 539,910, Oct. 7, 1983, abandoned.

[51] Int. Cl.$^4$ .............................................. C02F 1/56
[52] U.S. Cl. ............................... 210/727; 209/5; 210/734
[58] Field of Search ............... 209/5; 210/725, 727, 210/728, 734, 735

[56] References Cited

U.S. PATENT DOCUMENTS

| | | | |
|---|---|---|---|
| 2,903,423 | 9/1959 | Mondria et al. | 210/643 |
| 3,408,293 | 10/1968 | Dajani et al. | 210/727 |
| 3,493,499 | 2/1970 | Zeitoun et al. | 210/727 |
| 3,617,568 | 11/1971 | Ries | 210/727 |
| 3,717,574 | 2/1973 | Werneke | 210/727 |
| 3,859,212 | 1/1975 | Smalley et al. | 210/734 |
| 4,342,653 | 8/1982 | Halverson | 210/734 |

FOREIGN PATENT DOCUMENTS

| | | | |
|---|---|---|---|
| 0055489 | 7/1982 | European Pat. Off. | 210/727 |
| 51-81451 | 7/1976 | Japan | 210/727 |
| 52-037580 | 3/1977 | Japan | 210/733 |
| 52-071391 | 6/1977 | Japan . | |

*Primary Examiner*—Peter Hruskoci

[57] ABSTRACT

An improved method for flocculating suspended particulate solids from an acidic aqueous medium and for clarifying said aqueous medium comprises initially contacting the suspension with a water-soluble polymer having an anionic character followed by contacting the suspension with a water-soluble polymer having a cationic character. Such method is particularly useful in clarifying acidic aqueous media used in mining operations, etc.

12 Claims, No Drawings

FLOCCULATION OF SUSPENDED SOLIDS FROM AQUEOUS MEDIA

CROSS-REFERENCE TO RELATED APPLICATION

This application is a continuation-in-part of U.S. patent application Ser. No. 539,910, filed Oct. 7, 1983 now abandoned.

BACKGROUND OF THE INVENTION

This invention relates to methods of flocculating particulate solids suspended in aqueous media.

In the processing of mineral ores, coal and other industrial slurries, it is often necessary to flocculate suspended solids from aqueous media, and in particular, acidic aqueous media. For example, in the case of mineral ores and coal containing materials, it is often desirable to subject such ores and coal products to an acid treatment or an acid leaching or acid digestion step in order to facilitate the separation of the mineral or coal values from the unwanted clays, sand and other finely divided solids. Such acid treatment steps often generate suspensions of finely divided solids in acidic aqueous media from which solids must be flocculated before further processing can occur or the liquid media can be discharged, recycled or used. Conventionally, such flocculation is accomplished by contacting the suspension with a water-soluble copolymer of acrylamide and acrylic acid or acid hydrolyzed polyacrylonitrile as described in British Pat. No. 760,279 and U.S. Pat. No. 3,418,237. Unfortunately, these polymers, i.e., the nonionic polyacrylamide and the anionic copolymers of acrylamide and acrylic acid are not as effective in flocculating suspended solids from acidic aqueous media as is desired.

More recently, the use of anionic polymers has been disclosed as being effective in flocculating various systems as is described in U.S. Pat. Nos. 3,717,574 and 4,342,653. However, the methods of flocculation taught in said patents are not as effective in providing supernatant liquids of high clarity (i.e., free of fine particulate matter) as is desirable. That is, due to the nature of impurities such as fine amorphous silica particles and low pH colloids, the clarity of the supernatant liquids is poor.

The use of an amount of anionic polymer containing a carboxylic acid, a carboxylic acid anhydride and a carboxylic acid salt; and a cationic polymer to remove coal fines and clay from an aqueous suspension is disclosed in U.S. Pat. No. 3,408,293. Unfortunately, such a combination provides a method for clarifying systems exhibiting a limited pH range. In addition, such a combination requires careful control of amounts of polymers employed and of settling rates of flocculated particles.

In view of the deficiencies of the prior art, it would be highly desirable to provide an improved method for flocculating suspended solids from aqueous media which is effective in providing a supernatant liquid having improved clarity.

SUMMARY OF THE INVENTION

The present invention is such an improved method for flocculating suspended particulate solids from an acidic aqueous medium and for increasing the clarity of said aqueous medium. This method comprises initially contacting the aqueous medium (i.e., suspension) with a flocculating amount of a water-soluble polymer having an anionic character comprising a nonionic, ethylenically unsaturated monomer and an ethylenically unsaturated sulfonate monomer; followed by contacting the suspension with a clarifying amount of a water-soluble polymer having a cationic character comprising a nonionic, ethylenically unsaturated monomer and an ethylenically unsaturated monomer containing cationic moieties wherein said polymer having an anionic character contains a molar concentration of sulfonate moieties sufficient to provide flocculant activity in the acidic aqueous medium that is greater than the flocculant activity of an acrylamide/acrylic acid polymer having the same molecular weight and a molar concentration of carboxylate moieties similar to the molar concentration of sulfonate moieties of said polymer having an anionic character, and wherein said polymer having a cationic character provides clarifying activity of the supernatant liquid which is greater than that clarity provided to said aqueous medium by said polymer having an anionic character.

Surprisingly, the practice of the present invention enables one to achieve about the same or better rate or degree of flocculation than can be achieved using conventional anionic copolymers. In addition, the present invention enables one to achieve a better degree of clarity of supernatant liquid than has been achieved using conventional flocculating techniques.

The practice of the present invention is found to successfully flocculate any of a wide variety of suspended solids from aqueous media such as in mining operations, waste treatment, etc. Of particular interest for treatment in accordance with this invention are the acidic suspensions of minerals and acidic ore pulp such as pulps made from weathered ores and mineral products, acid leached gold ores, copper ores, copper flotation concentrates, copper tailings and acid leached copper residues, acid leached bauxite ores, acid leached beryllium or palladium ores, water or acid zinc sulfide concentrates, acid leached cyanidation tailings containing pyrite, gold and uranium bearing materials, acidic titanic sulfate digestion residues from crude titaniferous materials such as ilmenite or concentrates, etc., as well as acidic suspensions of ores and minerals such as zinc refinery sludges, flotation products, zirconium oxide and iron oxide slimes, and various coal slurries, particularly coal slurries containing bituminous and anthracite coal fines.

DETAILED DESCRIPTION OF THE INVENTION

For purposes of this invention, the term "acidic suspension" is meant to include any aqueous suspension of solid particles wherein "acidic" or "highly acidic" mean that this aqueous media has a pH less than about 4, preferably less than about 3, more preferably from about 0.2 to 2, most preferably from about 0.5 to 1.2. The particulate solids which may be suspended in such suspensions include any of the materials that are characteristic in the foregoing exemplified suspensions. In addition to such acidic suspensions as exemplified hereinbefore, other suspensions that are suitably employed include various acidic aqueous suspensions of cellulosic materials that are characteristically found in the manufacture of paper, as well as suspensions occurring in the manufacture of concrete and sugar wherein valuable or unwanted gangue is separated from liquid phase via filtration, sedimentation or centrifugation. Of these acidic suspensions, those derived from various metal ore refining processes, particularly those used in the recovery of uranium, copper, gold, beryllium and vanadium, are preferred with the suspensions characteristic of the recovery of uranium being most preferred. In general, the acidic suspensions contain from about 1 to about 45, preferably from about 6 to about 38, most preferably from about 10 to about 28, weight percent of suspended solids.

By the term "ethylenically unsaturated monomer containing anionic moieties" is meant a monomer containing, for example, sulfonate and optionally carboxylate moieties. Thus, the preferred anionic polymers of this invention are the sulfonate polymers. Sulfonate polymers suitably employed in the practice of this invention are polymers comprising nonionic, ethylenically unsaturated monomers with anionic, ethylenically unsaturated monomers containing sulfonate or sulfonic acid moieties. The sulfonate polymer contains sufficient water-soluble monomer to render the polymer water-soluble and sufficient sulfonate ($SO_3M$ wherein M is H, metal or ammonium) to increase the flocculant efficiency of the polymer to a value above that of a similar polymer of the nonionic monomer and a carboxylate comonomer. Preferred polymers contain from about 5 to about 95, most preferably from about 50 to about 80, weight percent of the nonionic monomer and from about 95 to about 5, most preferably from about 50 to about 20, weight percent of the sulfonate monomer. Polymers also can contain, rather than a portion of said nonionic monomer, up to about 30 weight percent of an ethylenically unsaturated carboxylic acid (e.g., acrylic or methacrylic acid) or a metal or ammonium salt thereof, more preferably from about 5 to about 30, most preferably from about 5 to about 15, weight percent of such carboxylic acid or salt. The molecular weight of the sulfonate polymer is sufficient to enable the polymer to function as a flocculant, but less than that which would render the polymer insoluble in water. Preferred sulfonate polymers have number average molecular weights (Mw) in the range from about 100,000 to about 10 million, most preferably from about 2 million to about 8 million. For purposes of this invention, a water-soluble polymer is one which forms a thermodynamically stable mixture when combined with water. These mixtures form spontaneously and include (1) true solutions in which the individual polymer molecules are dispersed and (2) micellular or colloidal solutions wherein the polymer molecules are aggregated to some extent but wherein such aggregates are no larger than colloidal size. It is also desirable that such polymers are soluble in brines or other such aqueous solutions.

Exemplary nonionic monomers suitably employed in the practice of this invention are those ethylenically unsaturated monomers that are sufficiently water-soluble to form at least a 10 weight percent solution when dissolved in water and readily undergo addition polymerization to form polymers that are water-soluble. Examples of such nonionic monomers include ethylenically unsaturated amides such as acrylamide, methacrylamide and fumaramide; their water-soluble N-substituted nonionic derivatives such as the N-methylol derivatives of acrylamide and methacrylamide as well as the N-methyl and N,N-dimethyl derivatives of acrylamide and methacrylamide; hydroxyalkyl esters of unsaturated carboxylic acids such as hydroxyethyl acrylate and hydroxypropyl acrylate; and the like. Of the foregoing nonionic monomers, the ethylenically unsaturated amides are preferred with acrylamide being especially preferred.

Examples of suitable ethylenically unsaturated sulfonate monomers include N-sulfoalkyl, $\alpha,\beta$-ethylenically unsaturated amides such as 2-acrylamido-2-methylpropane sulfonic acid, 2-aacrylamido propane sulfonic acid, 2-acrylamido ethane sulfonic acid and the alkali metal salts thereof such as the sodium and potassium salts thereof as well as other such monomers listed in U.S. Pat. No. 3,962,673 which is hereby incorporated by reference; sulfoalkyl esters of unsaturated carboxylic acids such as 2-sulfoethyl methacrylate and other such sulfoalkyl esters as listed in U.S. Pat. No. 4,075,134 which is also incorporated by reference as well as the alkali metal salts thereof; sulfoarylalkenes such as vinylbenzyl sulfonic acid and the various salts of vinylbenzyl sulfonate, p-styrene sulfonic acid and the salts thereof; sulfoalkenes such as vinyl sulfonic acid and salts thereof; and the like. Of the foregoing sulfonate monomers, the sulfoalkyl derivatives of acrylamide and methacrylamide are preferred with those of acrylamide being especially preferred, particularly 2-acrylamido-2-methylpropane sulfonic acid (AMPS), 2-acrylamido-2-propane sulfonic acid and the salts thereof. In the most preferred embodiments, the sulfo group is in the form of. an alkali metal sulfonate salt such as sodium sulfonate.

The most preferred sulfonate polymers for the purpose of this invention are polymers comprising from about 50 to about 80 weight percent of acrylamide with from about 20 to about 50 weight percent of an AMPS monomer preferably in salt form. Such polymers often contain, rather than a portion of said acrylamide monomer, from about 0 to about 30, preferably from about 5 to about 15, weight percent of acrylic acid or salt thereof such as sodium acrylate. It is understood that the acrylate moieties can be provided by, for example, polymerizing an unsaturated acid such as acrylic acid, or by hydrolyzing a species such as polymerized acrylamide.

The aforementioned sulfonate polymers are readily prepared by conventional procedures such as aqueous phase polymerization as described by Schildknecht (II) in *Polymer Process*, Interscience, 191–194 (1956) or disperse aqueous phase polymerization as described in U.S. Pat. No. 3,284,393. Normally such polymerization is carried out in the presence of a polymerization initiator capable of generating free radicals. Preferably, this free radical initiator is employed in amounts from about 0.0001 to about 0.1 weight percent of initiator based on the monomers. Exemplary polymerization initiators include the inorganic persulfates such as potassium persulfate, ammonium persulfate and sodium persulfate, azo catalyst such as azobisisobutyronitrile and dimethyl azoisobutyrate; organic peroxygen compounds such as benzyl peroxide, t-butyl peroxide, diisopropylbenzene hydroperoxide and t-butyl hydroperoxide. Of these initiators, the organic peroxygen compounds are preferred. Particularly preferred are combinations of these peroxygen compounds with reducing agents to provide conventional redox catalyst systems. Examples of such reducing agents are sodium bisulfite, sulfur dioxide, sodium borohydride and the like. In addition to the aforementioned ingredients, the polymerization recipe optionally includes chain transfer agents such as isopropyl alcohol, chelating agents, buffers, salts and the like.

By the term "ethylenically unsaturated monomer containing cationic moieties" is meant such a monomer containing, for example, a quaternized nitrogen moiety.

Cationic polymers suitably employed in the practice of this invention are copolymers of the aforementioned nonionic, monomers such as acrylamide and methacrylamide with a quaternized nitrogen-containing, ethylenically unsaturated monomer such as acryloylalkyl trialkyl ammonium salts, e.g., acryloylethyl trimethyl ammonium chloride; methacryloylalkyl trialkyl ammonium salts, e.g., methacryloylethyl trimethyl ammonium chloride; acrylamido- and methacrylamidoalkyl trialkyl ammonium salts, e.g., acrylamidopropyl trimethyl ammonium chloride and methacrylamidopropyl trimethyl ammonium chloride. Such copolymers have generally low molecular weight with preferred copolymers having weight average molecular weights (Mw) in excess of about 10,000. High molecular weight copolymers can also be employed. Such copolymers have molecular weights in excess of 100,000, and most preferred high molecular weight copolymers have molecular weights (Mw) in the range of from about 1 million to about 25 million. These cationic copolymers have sufficient cationic moiety to increase the capability of the copolymer to flocculate and clarify aqueous suspensions of particular matter. Such cationic copolymers contain from about 1 to about 90 weight percent of cationic monomers. Preferred cationic copolymers have from about 1 to about 30 weight percent, more preferably from about 2 to about 20 weight percent cationic moiety. Also suitable are the quaternized polyalkylene polyamines.

The aforementioned cationic polymers are readily prepared by conventional procedures such as disperse aqueous phase polymerization as described in U.S. Pat. No. 3,284,393. Low molecular weight cationic copolymers are advantageously prepared by Mannich base modification as is taught in U.S. Pat. No. 4,14,827 which is incorporated herein by reference.

In the practice of this invention, the suspensions can be clarified to a level such that the transmittance of light through the aqueous liquid is higher than that achieved using previous techniques, and is often in excess of 75 percent and under preferred conditions is in excess of 85 percent. Such improved flocculating ability and clarity is possible in a wide pH range, as for examle, from about 0.2 to about 14. It is understood that an inorganic co-flocculant can also be employed in the practice of this invention.

In practice, the suspension is contacted with an amount of the aforementioned sulfonate (i.e., anionic) polymer which is sufficient to remove the suspended particles from the aqueous phase. In preferred embodiments wherein the acidic suspension is an acidic ore pulp or suspension of mineral material which contains, in addition to the mineral value, a clay or similar silicate material, the sulfonate polymer is added in an amount sufficient to flocculate the clay particles as well as suspended metal values. In cases of where the metal values are later actually dissolved in the aqueous phase, the clay particles are flocculated and the dissolved metal values are recovered via conventional techniques such as electrolysis, precipitation, or the like. Preferably, the amount of sulfonate polymer employed to flocculate the suspended solids is in the range from about 1 to about 5000 weight parts of the sulfonate polymer per million weight parts of solids in the suspension, more preferably from about 5 to about 1000 ppm, most preferably from about 10 to about 500 ppm. Most preferably, the amount of sulfonate polymer which is employed is greater than or about equal to the amount of cationic polymer which is employed. The mode of adding the sulfonate polymer to the suspension is not particularly critical as long as a uniform dispersion of the polymer in the acidic suspension is achieved. Advantageously, however, the polymer is dissolved in an aqueous solution in concentrations, from about 0.001 to about 2 weight percent, most preferably from about 0.025 to about 0.2 weight percent prior to the addition to the suspension. It is understood that the sulfonate polymer can be added as a water-in-oil emulsion to the suspension. Examples of such emulsions are described in U.S. Pat. RE No. 28,474. Such emulsions contain sufficient water-soluble surfactant to cause inversion of the emulsions when combined with such a suspension. Alternatively, the emulsion may be inverted to form an aqueous solution and then added to the suspension.

Following the addition of the anionic copolymer to the suspension, said suspension is contacted with an amount of the aforementioned cationic coplymer which is sufficient to remove the remaining suspended particles from the aqeous phase.

In preferred embodiments wherein the suspension contains suspended clay particles, the cationic polymer is added in amounts sufficient to remove both suspended particles and clay particles from the aqueous phase. Preferably, such amounts are in the range from about 0.1 to about 500 weight parts of the polymer per million weight parts of the suspension, more preferably from about 0.5 to about 25 ppm, most preferably from 1 to about 10 ppm. The mode of adding the cationic polymer to the suspension is not particularly critical as long as a uniform dispersion of the polymer in the aqueous suspension is achieved. Advantageously, however, the cationic polymer is dissolved in an aqueous solution in concentrations from about 0.2 to about 1.5 weight percent, most preferably from about 0.3 to about 0.6 weight percent prior to addition to the suspension. It is understood that the cationic polymer can be added to the coal liquor as a water-in-oil emulsion, e.g., as described in U.S. Pat. RE No. 28,474, which contains sufficient water-soluble surfactant to cause inversion when combined with the aqueous medium. Alternatively, the emulsion may be inverted to form an aqueous solution and then added to the coal liquor. The time at which the cationic polymer is added to the suspension can vary from several seconds after the anionic polymer has been dispersed in the suspension, until the time at which flocculation is substantially complete.

The following examples are intended to illustrate the invention and are not intended to limit the scope thereof. In the examples, all parts and percentages are by weight unless otherwise specified.

GENERAL PROCEDURE FOR CLARIFICATION OF ACIDIC SUSPENSION

The sulfonate copolymer is first dissolved in water to provide a 0.1 percent solution of the anionic polymer. This solution is allowed to stand for a period of 0.5-2 hours. It is diluted to a concentration of 0.025 percent immediately prior to use.

The acidic suspension containing primarily clay particles as the suspended particulate is then combined with a given amount of the anionic polymer solution. After 2 minutes of mixing, the cationic polymer is added to the acidic suspension. The resulting suspension (250 ml) is placed into a 250 ml graduated cyclinder which is stoppered and rotated end over end for 6 consecutive rotations. The flocculation of suspended solids is observed by measuring the rate of drop of interface between suspended solids and clear supernatant (Settling Rate). The suspension comprises kaolinite, montmorillonite (sodium bentonites), calcium bentonite, amorphous silica, amorphous aluminum hydroxide and calcium sulfate crystals such that the pH of the suspension is 1.5.

acrylamide and is sold commercially as Separan* CP-HF flocculant.

*Trademark of The Dow Chemical Company

Following the aforementioned general procedure, the above-described copolymer is used to clarify three acidic suspensions and the results are set forth in Table I.

TABLE I

| Sample No. | Polymer Type[1] Anionic | Polymer Type[1] Cationic | Ratio Anionic Polymer Cationic Polymer[2] | Settling Rate[3] | Clarity[4] |
|---|---|---|---|---|---|
| 1 | AAM/AMPS | AAM/DMAM | 3:1 | 3.8 | 10 |
| C-1* | AAM/AMPS | — | — | 0.7 | 2 |
| C-2* | AAM/DMAM | AAM/AMPS | 1:3 | 2.2 | 2 |

*Not an example of the invention.
[1]Anionic polymer is 70/30 ratio of AAM/AMPS (acrylamide/sodium salt). Cationic polymer is 15/85 ratio of AAM/DMAM (acrylamide/dimethylaminomethyl acrylamide).
[2]Ratio is 15 ppm:5 ppm.
[3]Settling rate is in inch/minutes.
[4]Clarity is measured by pouring the supernatant liquid into a wedge shaped container and observing the numbers which are calibrated on the opposite side of the wedge. The higher the number, the greater the clarity.

EXAMPLE 1

PREPARATION OF SULFONATE POLYMER

Into a liter reaction kettle equipped with a stirrer, thermocouple, nitrogen inlet tube, gas vent and a heating mantle are charged the following with stirring:
(1) 54 g of a 50 percent solution of sodium 2-acrylamido-2-methylpropane sulfonate (NaAMPS) in water (pH=9-9.5)
(2) 126 g of a 50 percent solution of acrylamide (AAM) in water (pH=5.5)
(3) 420 g of water
(4) 5 g of sodium carbonate.

Nitrogen is bubbled through the stirred solution for 1 hour. To this stirred solution are then added the following solutions:
(1) aqueous solution of pentasodium salt of (carboxymethylimino)bis(ethylenenitrilo)-tetraacetic acid (V-80) sufficient to provide 4000 ppm of V-80 in the stirred solution
(2) aqueous solution of t-butyl hydroperoxide (TBHP) sufficient to provide 400 ppm of TBHP in the stirred solution
(3) aqueous solution of sodium borohydride (NaBH$_4$) sufficient to provide 3 ppm of NaBH$_4$ in the stirred solution.

The temperature of the stirred solution rises to 15°–25° C. and is maintained at such temperature for 1 hour. The resulting aqueous solution of AAM/AMPS copolymer is removed and dried to a white solid. The copolymer contains 30 percent NaAMPS and 70 percent AAM and has an Ostwald viscosity (0.5 percent copolymer in 4 percent NaCl in water at 25° C.) of 35.8 centipoises.

The cationic polymer which is employed for purposes of illustration is a dimethylaminomethyl poly- The data in Table I indicates that the method of this invention provides an increased settling rate and increased clarity to the aqueous medium.

EXAMPLE 2

A sulfonate copolymer comprising in polymerized form about 70 weight percent acrylamide and about 30 weight percent 2-acrylamido-2-methylpropane sulfonic acid and is similar to that sulfonate copolymer described. Example 1 is provided and is designated as Polymer A. A cationic polymer which is sold commercially as Separan ® CP-7HS and is similar to that cationic polymer described in Example 1 is provided and is designated as Polymer B. An anionic polymer comprising, in polymerized form, about 70 weight percent acrylamide and about 30 weight percent sodium acrylate, and which is sold commercially as Separan ® AP-273 is provided and is designated as Polymer C.

A suspension comprising about 95 weight percent deionized water and about 5 weight percent kaolin clay is provided and the pH of the suspension was adjusted to the desired pH using concentrated sulfuric acid. A suspension comprising about 95 weight percent deionized water and about 5 weight percent montmorillonite is provided and the pH of the suspension is adjusted to the desired pH using concentrated sulfuric acid. A suspension comprising about 90 weight percent deionized water and about 10 weight percent calcium bentonite is provided and the pH of the suspension is adjusted to the desired pH using concentrated sulfuric acid.

The suspensions were each treated with Polymer A only; Polymer A and Polymer B; and Polymer C and Polymer B in a manner as described in Example 1. The settling rates and clarity as defined in footnotes 3 and 4 of Example 1 are determined.

Results are presented in Table II.

TABLE II

| Sample | Suspension | Treatment Polymer 1 | (Amount) (ppm) | Polymer 2 | (Amount) (ppm) | pH of Suspension | Settling Rate | Clarity |
|---|---|---|---|---|---|---|---|---|
| C-1 | Kaolin Clay | A | (48) | — | — | 1 | 0.2 | 3 |
| 1 | Kaolin Clay | A | (48) | B | (16) | 1 | 1.5 | 10 |
| C-2 | Kaolin Clay | C | (48) | B | (16) | 1 | 0.5 | 6 |
| C-3 | Kaolin Clay | A | (48) | — | — | 2 | 0.8 | 7 |
| 2 | Kaolin Clay | A | (48) | B | (16) | 2 | 2.5 | 10 |
| C-4 | Kaolin Clay | C | (48) | B | (16) | 2 | 1.0 | 7 |
| C-5 | Kaolin Clay | A | (48) | — | — | 3 | 0.5 | 6 |
| 3 | Kaolin Clay | A | (48) | B | (16) | 3 | 1.0 | 10 |

TABLE II-continued

| Sample | Suspension | Treatment Polymer 1 | (Amount) (ppm) | Polymer 2 | (Amount) (ppm) | pH of Suspension | Settling Rate | Clarity |
|---|---|---|---|---|---|---|---|---|
| C-6 | Kaolin Clay | C | (48) | B | (16) | 3 | 0.4 | 5 |
| C-7 | Montmorillonite | A | (96) | — | — | 1 | 0.1 | 1 |
| 4 | Montmorillonite | A | (96) | B | (32) | 1 | 0.5 | 4 |
| C-8 | Montmorillonite | C | (96) | B | (32) | 1 | 0.1 | 1 |
| C-9 | Montmorillonite | A | (112) | — | — | 2 | 03 | 2 |
| 5 | Montmorillonite | A | (112) | B | (37) | 2 | 1.0 | 6 |
| C-10 | Montmorillonite | C | (112) | B | (37) | 2 | 0.4 | 3 |
| C-11 | Montmorillonite | A | (112) | — | — | 3 | 0.3 | 3 |
| 6 | Montmorillonite | A | (112) | B | (37) | 3 | 1.0 | 6 |
| C-12 | Montmorillonite | C | (112) | B | (37) | 3 | 0.5 | 3 |
| C-13 | Ca Bentonite | A | (24) | — | — | 1 | 1.0 | 2 |
| 7 | Ca Bentonite | A | (24) | B | (8) | 1 | 2.2 | 10 |
| C-14 | Ca Bentonite | C | (24) | B | (8) | 1 | 1.0 | 2 |
| C-15 | Ca Bentonite | A | (24) | — | — | 2 | 0.8 | 1 |
| 8 | Ca Bentonite | A | (24) | B | (8) | 2 | 2.3 | 9 |
| C-16 | Ca Bentonite | C | (24) | B | (8) | 2 | 1.2 | 2 |
| C-17 | Ca Bentonite | A | (24) | — | — | 3 | 1.0 | ~0 |
| 9 | Ca Bentonite | A | (24) | B | (8) | 3 | 2.2 | 6 |
| C-18 | Ca Bentonite | C | (24) | B | (8) | 3 | 0.9 | ~0 |

The data in Table II indicate that the treatment using the process of this invention provides good settling rates and clarity.

What is claimed is:

1. An improved method for flocculating suspended clay particulate solids from an acidic aqueous medium having a pH of less than about 3 and for increasing the clarity of said aqueous medium which comprises initially (1) contacting the aqueous medium with a flocculating amount of a water-soluble polymer having an anionic character comprising, in polymerized form, from about 50 to about 80 weight percent acrylamide and from about 20 to about 50 weight percent 2-acrylamide-2-methylpropane sulfonic acid or alkali metal salt thereof; followed by (2) contacting the suspension with a clarifying amount of a water-soluble polymer having comprising, in polymerized form, from about 10 to about 99 weight percent acrylamide and from about 1 to about 90 weight percent of a quaternized nitrogen-containing ethylenically unsaturated monomer wherein said polymer having an anionic character contains a molar concentration of sulfonate moieties sufficient to provide flocculant activity in the acidic aqueous medium that is greater than the flocculant activity of an acrylamide/acrylic acid polymer having the same molecular weight and a molar concentration of carboxylate moieties similar to the molar concentration character, flocculating said suspended clay particulate solids, and settling the flocculated clay particulate solids from said aqueous medium.

2. A method of claim 1 wherein said polymer of (1) is employed in amounts ranging from about 1 to about 5000 parts of polymer per million weight parts of suspended solids in the aqueous medium; and said polymer of (2) is employed in amounts ranging from 0.1 to about 500 parts of polymer per million weights parts of suspended solids in the aqueous medium.

3. A method of claim 1 wherein an inorganic coflocculant is incorporated therein.

4. A method of claim 1 wherein said aqueous liquid containing suspended solids is clarified to a level such that the transmittance of light through said aqueous liquid is at least about 75 percent.

5. A method of claim 1 wherein the pH of said aqueous medium is less than about 2.

6. A method of claim 1 wherein said aqueous liquid suspension contains from about 1 to about 45 weight percent solids.

7. A method of claim 1 wherein said aqueous liquid suspension contains from about 10 to about 28 weight percent solids.

8. A method of claim 1 wherein said suspended clay particles comprise kaolinite particles.

9. A method of claim 1 wherein said suspended clay particles comprise montmorillonite particles.

10. A method of claim 1 wherein said suspended clay particles comprise calcium bentonite particles.

11. A method of claim 1 wherein said clay particulate solids are selected from the group consisting of kaolinite, montmorillonite and calcium bentonite particles.

12. A method of claim 1 wherein said water-soluble polymer having a cationic character is dimethylaminomethylpolyacrylamide.

* * * * *

UNITED STATES PATENT AND TRADEMARK OFFICE
CERTIFICATE OF CORRECTION

PATENT NO. : 4,569,768
DATED : February 11, 1986
INVENTOR(S) : Mark J. McKinley

It is certified that error appears in the above-identified patent and that said Letters Patent is hereby corrected as shown below:

Column 4, line 6, "2-aacrylamido" should read --2-acrylamido--.

Column 4, line 10, "3,962,673" should read --3,692,673--.

Column 5, line 35, "4,14,827" should read --4,141,827--.

Column 5, line 43, "examle" should read --example--.

Column 6, line 6, ", from about" should read --from about--.

Column 6, line 19, "coplymer" should read --copolymer--.

Column 6, line 21, "aqeous" should read --aqueous--.

Column 6, line 66, "cyclinder" should read --cylinder--.

Column 10, Settling Rate heading, item 5, "03" should read --0.3--.

Column 9, line 38, before "comprising" add --a cationic character--.

Column 10, line 25, "weights" should read --weight--;

Signed and Sealed this

Second Day of December, 1986

Attest:

DONALD J. QUIGG

Attesting Officer       Commissioner of Patents and Trademarks